United States Patent [19]

Dragon

[11] 3,879,674

[45] Apr. 22, 1975

[54] AUTOMATIC GAIN CONTROL CIRCUIT

[75] Inventor: Thomas J. Dragon, Southfield, Mich.

[73] Assignee: Burroughs Corporation, Detroit, Mich.

[22] Filed: Dec. 27, 1973

[21] Appl. No.: 428,838

[52] U.S. Cl. ...................... 330/29; 330/139; 360/67

[51] Int. Cl. ............................................... H03g 3/30

[58] Field of Search........ 330/29, 86, 127, 138–140, 330/130, 141; 360/46, 67, 68

[56] References Cited

UNITED STATES PATENTS

| | | | |
|---|---|---|---|
| 3,327,236 | 6/1967 | Krossa et al. | 330/29 X |
| 3,408,588 | 10/1968 | Rugo | 330/29 |
| 3,488,604 | 1/1970 | Smilowitz | 330/139 X |
| 3,536,858 | 10/1970 | Limbaugh et al. | 330/29 |
| 3,662,365 | 5/1972 | Rodriguez et al. | 330/29 X |
| 3,679,986 | 7/1972 | Zaman | 330/29 X |

*Primary Examiner*—James B. Mullins
*Attorney, Agent, or Firm*—Franklin D. Ubell; Edwin W. Uren; Kevin R. Peterson

[57] ABSTRACT

An automatic gain control circuit for setting the gain of a read amplifier in response to a preamble signal level by adjusting the bias on the amplifier. The amplifier's gain is initially set at its maximum, and if the peak level of an analog form of the amplifier output overcomes a compared reference, the comparing circuitry emits a pulse which triggers capacitor-driving circuitry to charge a capacitor. The resultant variation in the capacitor's voltage adjusts the amplifier bias via an emitter-follower to reduce the amplifier gain and output analog signal levels. Once the analog level drops below the reference, the capacitor voltage is no longer affected, and after the preamble, the charging circuitry is positively disabled. Finally, the capacitor is discharged to prepare for a subsequent read operation.

8 Claims, 5 Drawing Figures

AUTOMATIC GAIN CONTROL CIRCUIT

BACKGROUND OF THE INVENTION

This invention relates broadly to automatic gain control (AGC) for an amplifier and specifically to an open loop automatic gain control circuit for fixing the gain of a read amplifier used in a data reading system employing double frequency phase encoding on numerous short magnetic strips.

It is well-known that, in such systems, variation in recorded data signal strength on the strips and variation in head parameters and head distance produce variation in the signal strength output from a read head assigned the task of reading the recorded data.

To supply the electronics of a magnetic code reading system with a constant rather than erratic amplitude data signal, automatic gain control circuits are employed by the prior art. These circuits adjust a read amplifier's output to maintain the output at a constant level, and several types are known, especially for use with magnetic tape and disc systems.

One common approach uses a feedback loop to continuously monitor the voltage at the output of a read amplifier and return a correction voltage to the input of the amplifier if the output voltage should vary from a desired reference. It has been recognized that this method has several disadvantages. In particular, considerable time is wasted in establishing initial gain stability, and the relatively slow response time of such circuits can render them insensitive to rapidly varying pulse patterns as well as limit the amount of deviation correctable by the AGC.

One prior art attempt to remedy this problem uses two different, preselected, incremental gain levels and a monitoring system for switching into one of these increments in response to a comparison between the amplitude of an amplified read signal and a threshold level. While such a system avoids continuous adjustment, it sacrifices precise gain control and may thus introduce error into a system incorporating it.

A recent approach employs a preamble signal fed to the read amplifier of a magnetic disc reading system. If the amplifier output exceeds a certain level, a ramp generator is actuated, which controls the conductance of two field effect transistors so as to reduce the magnitude of the input signal to the amplifier and hence reduce the output signal from the amplifier. While effective, this circuitry is overly complex and inappropriate when considering the operation and needs of a system such as that alluded to earlier for reading short magnetic strips.

SUMMARY OF THE INVENTION

It is, therefore, an object of the invention to simplify and improve automatic gain control circuitry.

It is another object of the invention to provide automatic gain control circuitry particularly adapted to adjust the gain of a read amplifier used in a system which reads and decodes double frequency phase encoded data from magnetic strips.

These and other objects of the invention are accomplished in the automatic gain control circuitry of the invention by translating the occurrence of an excess in the amplitude of a read-amplified preamble signal into alteration of a capacitor voltage controlling the bias applied to the read amplifier. Initially, an analog form of the read-amplified preamble signal is compared to a set reference. If the peak analog voltage exceeds that of the reference, the comparator circuitry produces a pulse, which causes driving circuitry to alter the capacitor voltage, dipping the gain of the read amplifier and consequently the analog level of the amplified preamble signal. A succession of comparator pulses will be delivered, if necessary, in response to the preamble signal pulses to drop the read amplifier gain to the desired level.

BRIEF DESCRIPTION OF THE DRAWINGS

The foregoing objects and advantage of the invention, together with other advantages attainable by its use, will be apparent from the following detailed description of the invention read in conjunction with the drawings of which.

DETAILED DESCRIPTION OF THE PREFERRED EMBODIMENT

Figure 2:
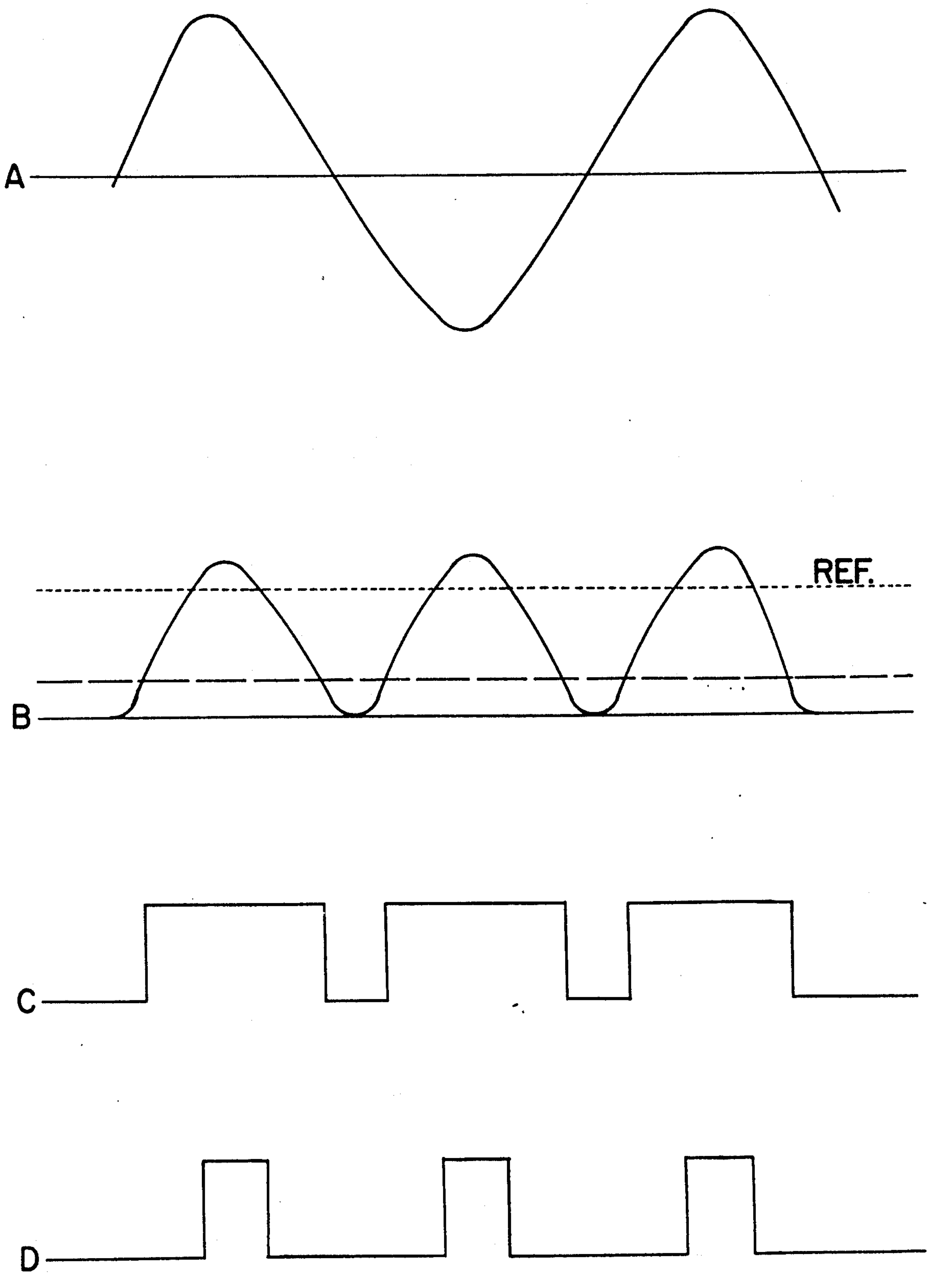
FIG. 2 is a timing diagram of signals appearing at various points in the circuitry of FIG. 1.

Referring to the drawing, the preferred embodiment of the automatic gain control circuitry of the invention includes a standard read amplifier 11, which receives signals from a head (not shown) for reading magnetic strips, for example. The amplifier is provided, as well-known in the art, with a bias terminal 12 for receiving a negative bias voltage which controls the amplifier operating point. The output 13 of the read amplifier 11 is fed to a full wave rectifier 15, which produces an analog form (FIG. 2B) of the amplifier output 13 (FIG. 2A). The rectifier 15 supplies one input 17 of a standard comparator 19, while the settable level of a reference voltage source 21 is applied to the other comparator input 23. The comparator output 30 feeds one input 26 of a standard AND gate 27, whose other input 28 is driven by an output from peak detector circuitry 35. This circuitry 35 monitors the analog output of the rectifier 15 and produces, among other signals, rectangular pulses, each of which begins and terminates in synchronization with an analog signal pulse as shown in FIG. 2B and C. The production of such rectangular pulses is well-known and forms no part of the present invention.

The AND gate 27 has its output 32 connected for triggering capacitor-driver circuitry 29, which drives a control capacitor $C_2$. The AND gate output 32 is connected to one terminal of a differentiating capacitor $C_1$ and to a resistor $R_1$, which is referenced to a positive voltage source $V_H$. The other terminal of the differentiating capacitor $C_1$ joins the base of an NPN switching transistor $Q_1$ and the ungrounded terminal of a resistor $R_2$. The collector of the switching transistor $Q_1$ is connected for exciting an NPN driver transistor $Q_2$ at its base, which is normally grounded through a resistor $R_3$. Both of the transistors $Q_1$, $Q_2$ have their emitters referenced to a negative voltage source $V_L$.

The control capacitor $C_2$ has three connections at its ungrounded terminal. First, the collector of the driver transistor $Q_2$ is connected there through a resistor $R_4$ for adding negative charge to the control capacitor $C_2$ when the driver transistor $Q_2$ is placed in a conducting state by the switching transistor $Q_1$. Secondly, a well-known emitter follower configuration 31 is attached for conveying the voltage of the control capacitor $C_2$ to the amplifier 11 via an emitter follower resistor $R_7$. Finally, capacitor-clear circuitry 33 is connected to the control capacitor $C_2$. The collector of a PNP capacitor-clear transistor $Q_3$ is connected to the control capacitor's ungrounded terminal while its base is connected to receive a reset signal through a resistor $R_5$.

Figure 1:
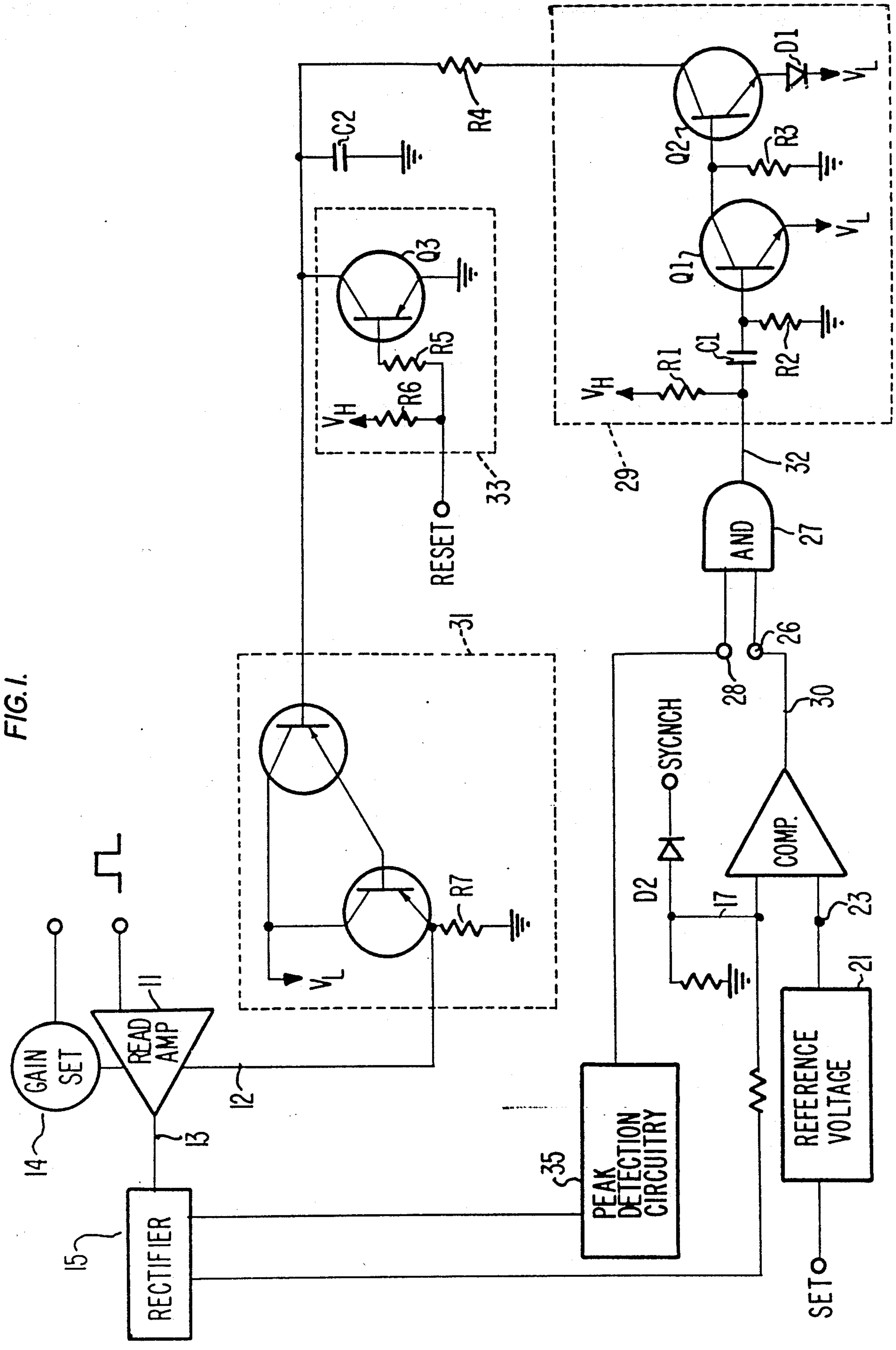
FIG. 1 is a schematic diagram of the circuitry of the preferred embodiment of the invention.

Now considering the operation of the circuitry of FIG. 1, the read amplifier 11 initially has more gain than that required to operate the read system. Its output signal (FIG. 2A) is supplied to the rectifier 15, which produces a rectified analog signal (FIG. 2B), which is sent to the comparator input 17. At the same time, the peak detection circuitry 35 supplies rectangular pulses (FIG. 2C) to one input 28 of the AND gate 27. If the peak of the first analog signal pulse should exceed the reference level supplied by the reference source 21, a pulse (FIG. 2D) appears at the comparator output 30, and the coincidence of this comparator pulse with a rectangular pulse (FIG. 2C) supplied to the AND gate input 28 produces a signal at the AND gate output 32. The requirement of coincidence between the rectangular and comparator pulses helps to prevent false triggering of the capacitor-driver circuitry 29.

The appearance of an output signal at the AND gate output 32 activates the capacitor-driver circuitry 29. The switching transistor $Q_1$ is normally held on as a result of the combined effect of the differentiating capacitor $C_1$, the ground applied through the resistor $R_2$ to the base of the transistor $Q_1$, and the negative voltage source $V_L$. However, when a gate output pulse is applied at the junction of the bias resistor $R_1$ and the capacitor $C_1$, the capacitor transmits a differentiated form of that pulse to the base of the switching transistor $Q_1$, momentarily deactivating it. The driver transistor $Q_2$ is thereby momentarily activated since its base is raised from the negative voltage $V_L$ to ground, and this activation adds charge to the control capacitor $C_2$.

The voltage on the control capacitor $C_2$ is thereby decreased a small amount, lowering the voltage across the emitter follower resistor $R_7$. The bias voltage applied from the emitter follower 31 to the amplifier 11 at the bias terminal 12 is thus lowered, and the gain of the amplifier 11 correspondingly decreased. If, after the initial reduction the gain of the amplifier 11 is still above the desired value, the second analog signal pulse will still exceed the reference supplied by the reference source 21. Hence, another trigger pulse will be applied to the capacitor driver circuitry 29, adding more charge, and again lowering the amplifier gain slightly. This intermittent charge increase will continue, under the stimulus of the preamble signal pulses, until the gain reaches the point where the peak analog signal amplitude no longer exceeds the fixed reference level supplied to the comparator. At this time, the intermittent charging of the control capacitor $C_2$ is halted because no further pulses will be emitted at the comparator output 30.

After a selected number of preamble pulses, twenty in the preferred embodiment, a synchronized signal is applied by apparatus not a part of the present invention to the cathode of a diode $D_2$, whose anode is connected to the analog input 17 of the comparator 19. This signal positively prevents any further output from the comparator and thus any further effect on the voltage of the control capacitor $C_2$. The control capacitor $C_2$ holds its charge and voltage, thus maintaining the bias on the amplifier 11 constant during the entire read period. At the end of the read period, a reset signal delivered from the system turns on the clear transistor $Q_3$, which discharges the control capacitor $C_2$ in preparation for reading the next preamble-data strip.

The above described AGC circuit has the advantage that the particular read amplifier used is not critical, as long as its maximum gain exceeds that which could possibly be needed in the system. Thus, initial adjustment of the amplifier is not necessary and the use of off-the-shelf equipment facilitated.

In this regard, it should be noted that setting the amplifier gain to absolute maximum is not essential. Since it is possible to predict the approximate minimum signal input to the amplifier from a knowledge of system tolerances, it is possible to estimate the amount of gain required to raise this minimum input level to the desired output level. This amount of gain is that which would be necessary in the extreme case — it is the estimated maximum gain which system tolerances could demand from the amplifier in order to produce the desired output level. It is then only necessary to initially set the amplifier gain at some comfortable margin above this amount of gain rather than at the absolute maximum gain, which may be well above that required by system tolerances.

The preferred embodiment of the invention has been described in terms of "adding negative charge" to the capacitor $C_2$. Of course, this description could have proceeded upon the equivalent concept of "removing positive charge," from the capacitor $C_2$. The effect produced — a decrease of voltage across the capacitor $C_2$ — is the same. If it were desired to increase this voltage, positive charge would be added to the capacitor $C_2$, hence the terminology "adding positive charge" would be appropriate. Thus, the expression "adding charge" as herein used may refer generically to adding either positive or negative charge. Finally, it should be noted that when charge is removed from the accumulating capacitor $C_2$ prior to a preamble signal in preparation for a gain adjustment, the removed charge is of the same polarity (positive or negative) as that which is later to be added to the gain adjustment operation.

Furthermore, although the preferred embodiment of the invention shows the voltage being decreased on the control capacitor, whether the voltage is increased or decreased is not critical to the invention since one of ordinary skill in the art could easily connect to the bias circuitry of the amplifier in order to produce the desired effect on its gain.

Obviously, many other variations in the above-described circuitry are possible without departing from the spirit of the invention. It is therefore to be understood that, within the scope of the appended claims, the invention may be practiced otherwise than as specifically described.

What is claimed is:

1. An automatic gain control system employed in a data reading system for adjusting the amplitude level of a preamble signal train to a desired level represented by a settable reference level prior to a read operation comprising:

a read amplifier supplied with said preamble signal train, having its bias set initially for amplifying said preamble signal train above said desired level and having a first bias terminal;

means for generating an analog form of the amplified preamble signal, said form having peaks representative of the level of said amplified preamble signal;

comparator means for comparing said analog form to said settable reference level and for generating a trigger pulse when said analog form exceeds said reference level;

driver circuitry for transferring an increment of charge in response to each said trigger pulse;

means for accumulating each said increment of transferred charge, thereby developing a voltage;

buffer means for isolating said voltage and applying said voltage to said first bias terminal of said amplifier, thereby incrementally lowering the gain of said amplifier; and means for removing said accumulated stored charge after completion of said read operation.

2. The automatic gain control system of claim 1 wherein said amplifier is a standard amplifier and said first bias terminal is a standard terminal for receiving a constant reference voltage.

3. The automatic gain control system of claim 1 wherein said accumulating means is a capacitor and said buffer means is an emitter follower.

4. The automatic gain control system of claim 1 wherein said data reading system includes means for producing a synchronizing pulse and said automatic gain control system further includes means for coupling said synchronizing pulse to said comparator means, thereby precluding the emission of said trigger pulses by said comparator means.

5. The automatic gain control system of claim 1 wherein said analog form comprises a train of analog pulses and further including:

means responsive to each said analog pulse for producing a rectangular pulse which begins and ends in synchronization with each said analog pulse; and gate means responsive only upon coincidence of a said rectangular pulse and a said trigger pulse for activating said driver circuit.

6. A method of automatic gain control for setting the gain of a read amplifier to produce a desired output level in response to each of a series of preamble signal trains having variable levels comprising the steps of:

initially fixing the gain of said amplifier such that the initial level of each said preamble signal train at the output of said amplifier is always greater than said desired output level;

developing an analog pulse train representative of the output level of said preamble signal train; and decrementing the gain of said amplifier in response to each excess of an analog pulse over said desired level.

7. The method of claim 6 wherein said step of decrementing the gain of said amplifier includes the steps of:

detecting an excess of a said analog pulse over a reference level representative of said desired level;

producing a trigger pulse in response to said detecting;

producing a charging pulse in response to said trigger pulse;

accumulating the increment of charge supplied by said charging pulse, thereby developing a voltage; and applying said voltage to a bias terminal of said read amplifier.

8. The method of claim 7 wherein said bias terminal is a standard terminal of a standard amplifier to which a D.C. reference voltage is normally applied.

* * * * *